Oct. 26, 1937.    H. S. JANDUS    2,097,328
BRAKE LEVER CONSTRUCTION
Filed Nov. 16, 1936    2 Sheets—Sheet 1
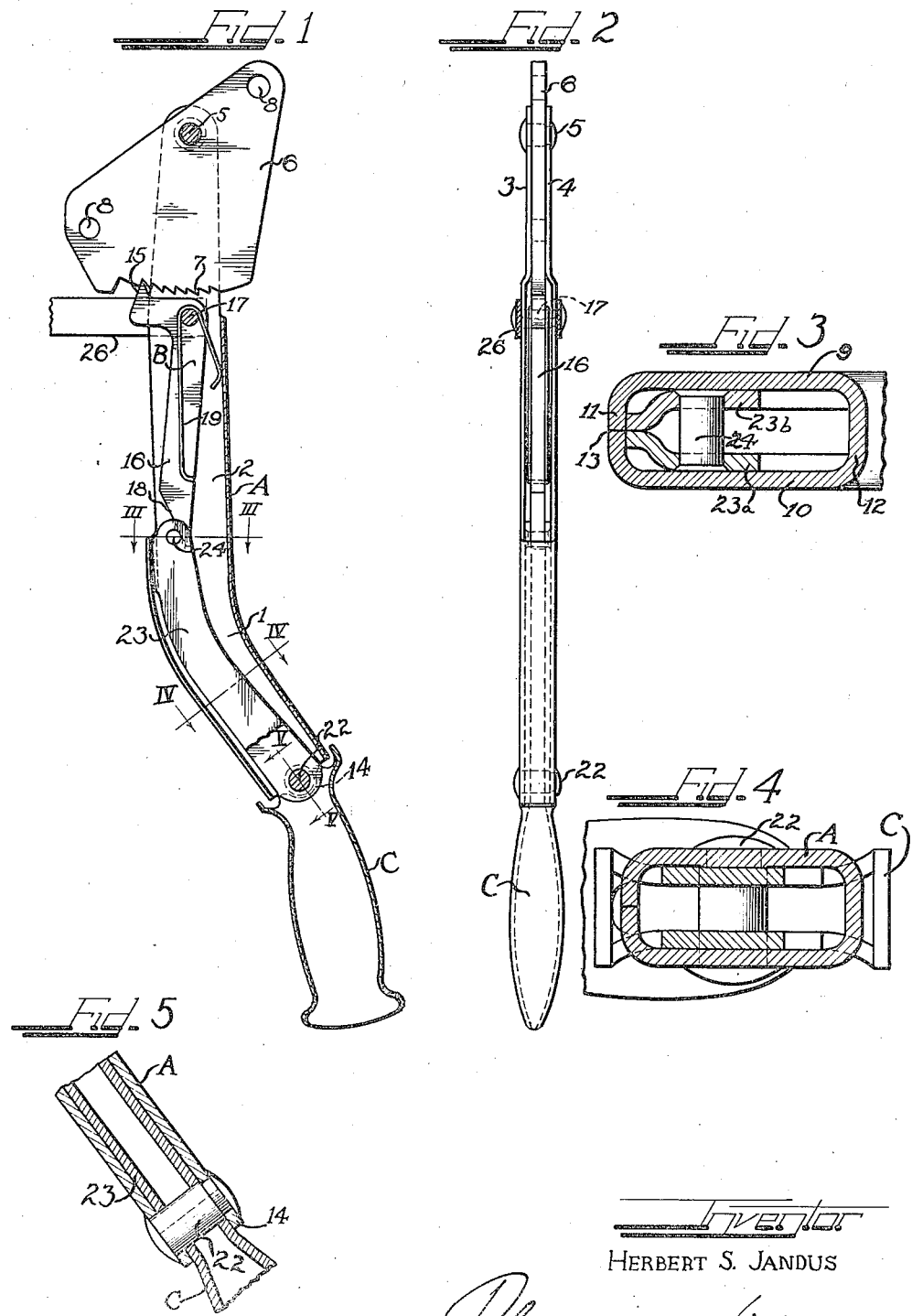
Inventor
HERBERT S. JANDUS

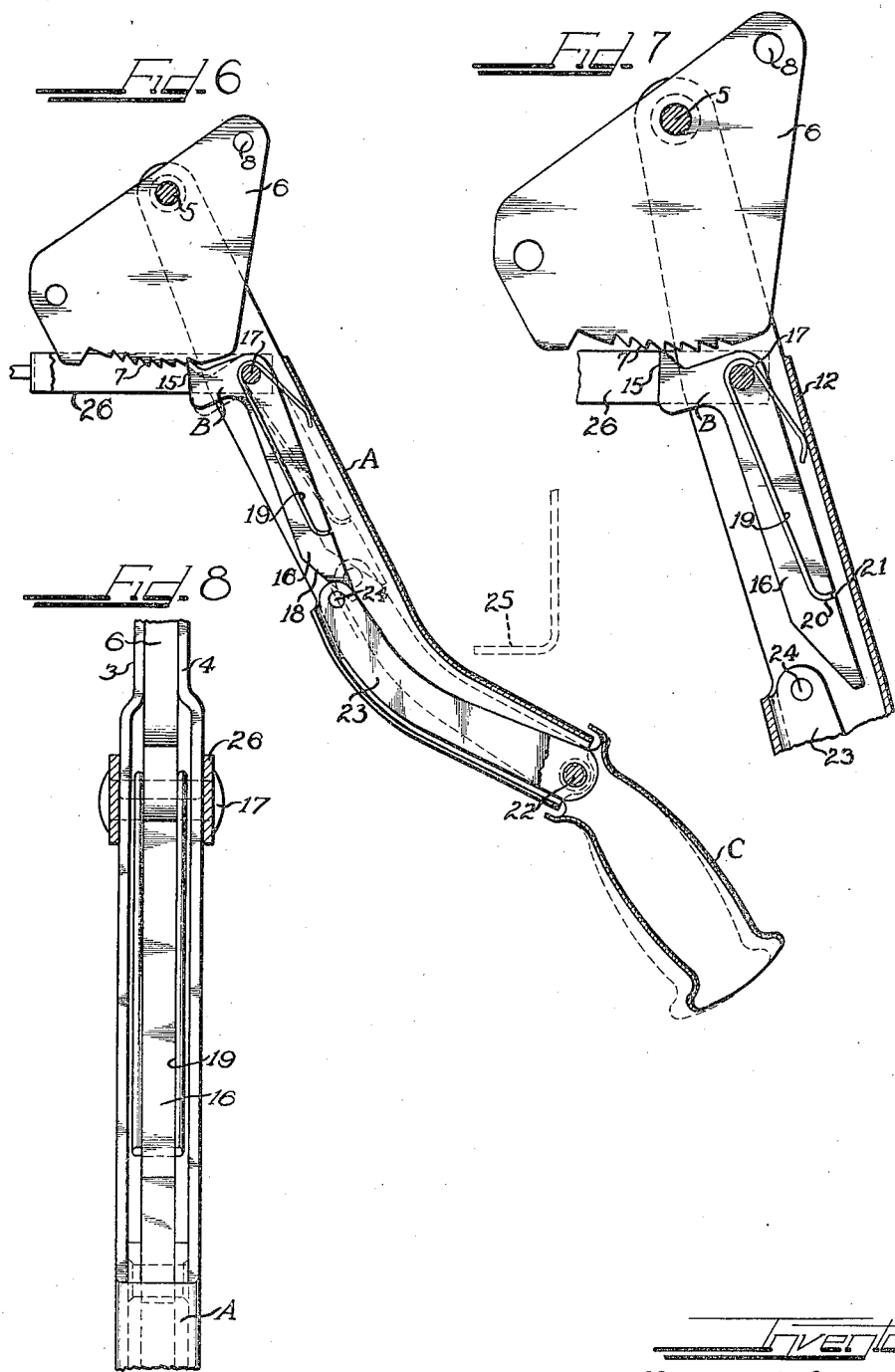

Patented Oct. 26, 1937

2,097,328

UNITED STATES PATENT OFFICE 2,097,328

BRAKE LEVER CONSTRUCTION

Herbert S. Jandus, Detroit, Mich., assignor to Oakes Products Corporation, North Chicago, Ill., a corporation of Michigan Application November 16, 1936, Serial No. 110,976

1 Claim. (Cl. 74—536)

The present inventon relates to brake lever construction and more particularly to a novel release mechanism for brake levers.

An object of the present invention is to provide a brake lever construction including novel release mechanism.

Another object of the present invention is to provide a ratchet type brake lever construction wherein the lever may be unlatched and moved to releasing position by hand pressure applied against a tiltable handle of the lever construction.

A further object of the present invention is to provide a brake lever construction wherein the lever is unlatched from brake setting position by tilting a handle portion of the lever.

A still further object of the present invention is to provide brake lever construction of the pawl and ratchet type, so constructed and arranged that the lever may be unlatched from brake setting position with minimum of physical effort.

The above, other and further objects of the present invention will be apparent from the following description and accompanying drawings.

The accompanying drawings illustrate a brake lever construction embodying principles of the present invention, and the views thereof are as follows:

Figure 1 is a view, partially in elevation and partially in section, of a brake lever constructed in accordance with the principles of the present invention, and showing the parts in released position;

Figure 2 is an elevational view of the lever of Figure 1, looking at the right hand margin of Figure 1;

Figure 3 is an enlarged transverse sectional view taken substantially in the plane indicated by line III—III of Figure 1;

Figure 4 is an enlarged transverse sectional view taken substantially in the plane indicated by line IV—IV of Figure 1;

Figure 5 is a fragmental enlarged sectional view taken substantially in the plane indicated by line V—V of Figure 1;

Figure 6 is a view of the lever of Figure 1 shown in brake setting or set position, showing in full lines the relationship of the parts when the lever is latched, and in dotted lines the relationship of the parts when actuated to unlatch the lever;

Figure 7 is a fragmental view, partially in elevation and partially in section, showing the relationship of certain of the parts when the detent is riding over the crest of a tooth of the ratchet;

Figure 8 is a fragmental elevational view of the left hand portion of the arrangement of Figure 7.

The drawings will now be explained.

The lever A, formed from sheet metal, provides a barrel portion 1, a trough-shaped portion 2, and spaced parallel legs 3 and 4. The extremities of the legs 3 and 4 are apertured to receive a pivot pin 5 for pivotally connecting the lever to the ratchet plate 6, which plate is provided with teeth 7 forming a ratchet.

The lever has been herein illustrated as of the dash type, that is with a ratchet plate attached to a bracket supported on the dashboard of an automotive vehicle behind the instrument board, and with the lever hanging or depending from the ratchet plate and, when in off or released position, lies behind the instrument board of the vehicle.

The ratchet plate 6 may be attached to a suitable supporting bracket in any convenient manner. The plate is provided with holes 8 for receiving bolts or rivets for securing the plate in fixed position.

In the formation of the barrel portion 1 of the lever the metal is so fashioned as to form side walls 9 and 10, and end walls 11 and 12. Preferably in the wall 11 a seam 13 occurs, where the abutting margins of the metal of which the barrel portion 1 is formed are brought together in close relationship.

The extremity of the free end of the lever A is provided with apertured lugs 14 which are arranged preferably in parallel relationship, for a purpose to be later explained.

A pawl or detent member B formed to provide a detent end 15 and a tail piece 16 is pivoted at 17 to the legs 3 and 4 of the lever A in such a manner that its detent end 15 engages the ratchet 7 of the ratchet plate, in the usual manner. The tail piece 16 of the pawl member extends along the length of the lever towards its free end, and at the extremity of the tail piece it is inclined as at 18 for a purpose to be later explained.

In order to normally maintain the detent 15 of the pawl in latched engagement with the ratchet 7, a spring, shown in the present instance as a hairpin spring 19, is utilized, which spring has a looped portion 20 engaging a notch 21 in the margin of the tail piece 16, with portions of the spring bent about the pivot pin 17 and bearing against the wall 12 of the lever A and functioning in such manner to maintain the pawl in the full line position of Figures 1 and 6.

For rocking the pawl, to unlatch it, a handle C is pivoted on a pin 22 which is secured in the apertured lugs 14 of the free extremity of the lever. The handle C is fashioned from sheet material in such manner as to provide a smooth, shapely handle portion and an extension 23, which extends within the barrel portion 1 of the lever towards the pivoted end of the lever. The extension 23 preferably comprises two portions 23a and 23b, Figure 3, which near the free ends thereof are brought together to form a bearing against the inner surface of the wall 11 of the lever barrel portion 1. The extremity of the extension 23 is preferably provided with a pin or roller 24 which is so disposed and positioned as to contact the inclined portion 18 of the tail piece 16 of the pawl.

The spring 19, in addition to normally maintaining the pawl in engagement with the ratchet, maintains contact between the inclined portion 18 of the tail piece and the extremity of extension 23 to retain the handle B in one position, and also to maintain bearing between the extremity of the extension 23 and the wall 11 of the lever body.

Figures 1 and 6, in full lines, show the relationship of the parts when the detent portion 15 of the pawl is in engagement with a tooth of the ratchet and which is the normal position of the parts when the lever is latched, in any position, with respect to the ratchet plate 6.

In moving the lever from the releasing or off position, of Figure 1, to the brake applying or set position of Figure 6, the operator grasps the handle C and moves the lever in counterclockwise direction, as viewed in these figures. Because of the fact that the extremity of the extension 23 is seated against the wall 11 of the brake lever A, no tilting of the handle C occurs, so that the handle C and the lever A act as a rigid lever during the movement of the lever in a direction to apply the brakes.

When it is desired to release the lever from its set or brake applying position, the only thing that has to be done is to push against the handle C and tilt it about its pivot 22, in clockwise direction, which tilting swings the extremity of the extension 23 to the right, as viewed in Figures 1 and 6, thereupon swinging the extremity of the tail piece 16 to the right, and unlatching the detent portion 15 of the pawl from the ratchet 7 whereupon the lever is returned to off or releasing position, as in Figure 1. As soon as pressure is removed from the handle C, the spring 19 becomes effective to return the parts to full line position of Figures 1 and 6.

The lever A, in its length, is bent so as to escape contact with the lower margin of an instrument board, a fragmental portion of which is shown at 25 in Figure 6, when the lever is moved to brake applying position.

As before stated, the normal or releasing position of the brake lever is behind the instrument board in out of the way.

A yoke or other element 26 is attached to the pin 17, for connection to a pull rod or pull cable of the brake mechanism of the vehicle.

It will be observed that the brake lever construction of the present invention is a simple one, involving, in the main, parts made of sheet metal stock, suitably formed and fashioned, in which the operating parts are relatively simple to construct and assemble. The brake lever construction of the present invention is, at the same time, one which affords a lever which may be economically manufactured, and one which is efficient in use.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

A brake lever construction including a flat plate having ratchet teeth on an edge thereof, a lever member formed of sheet metal having spaced parallel legs astraddle and pivoted to said plate and having a portion of its length of tubular formation, pawl means carried by said lever member and arranged for cooperation with the teeth of the ratchet, said pawl means having an integral elongated tail extending generally in the direction of the length of the lever member and having an inclined end adjacent one end of the tubular formation of said lever member, spring means acting between said lever member and said tail to normally maintain said pawl means in latched engagement with said ratchet, a handle member pivoted to said lever adjacent the other end of the tubular formation and having a grip portion of closed hollow form outwardly of said end of said lever member and an integral extension lying within and along the tubular formation of said lever member and carrying a roller at its inner end for contacting the inclined end of said pawl tail, and said extension having a part near its inner end which abuts a portion of the tubular formation of the lever member to limit pivotal movement of said grip in one direction, said extension part being normally held against said portion of said tubular formation by contact of the end of the pawl tail against the roller of said extension by action of said spring against said pawl tail.

HERBERT S. JANDUS.